S. BLICKMAN.
APPARATUS FOR MAKING AND DISPENSING COFFEE.
APPLICATION FILED DEC. 27, 1912.
1,174,660.
Patented Mar. 7, 1916.
3 SHEETS—SHEET 1.
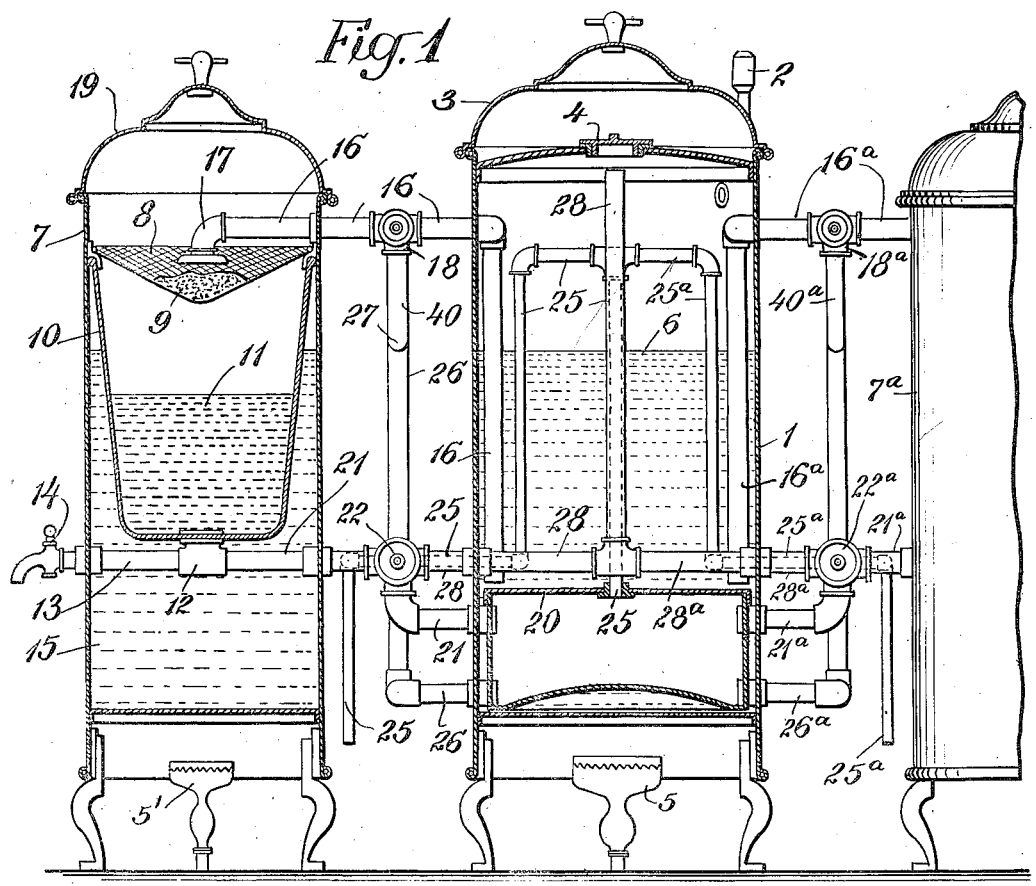
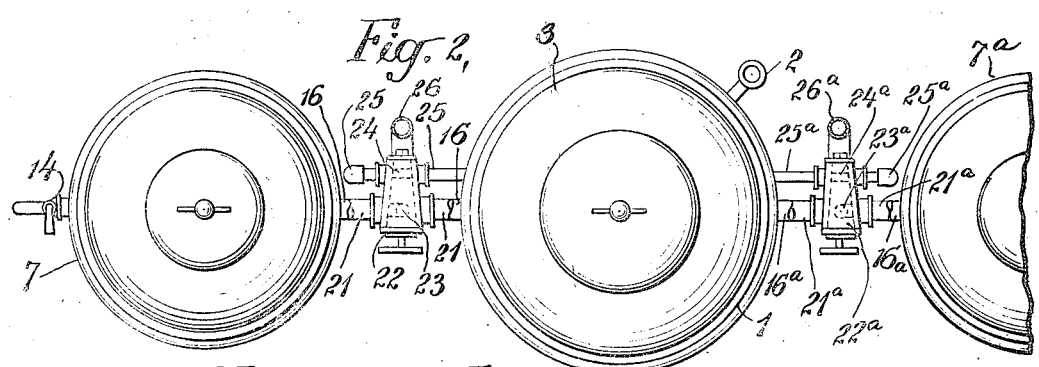
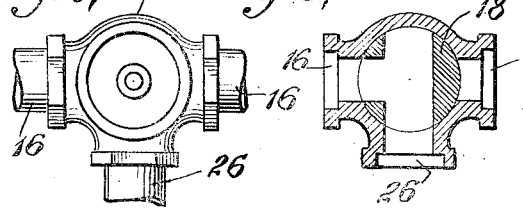
WITNESSES
INVENTOR
BY
ATTORNEY

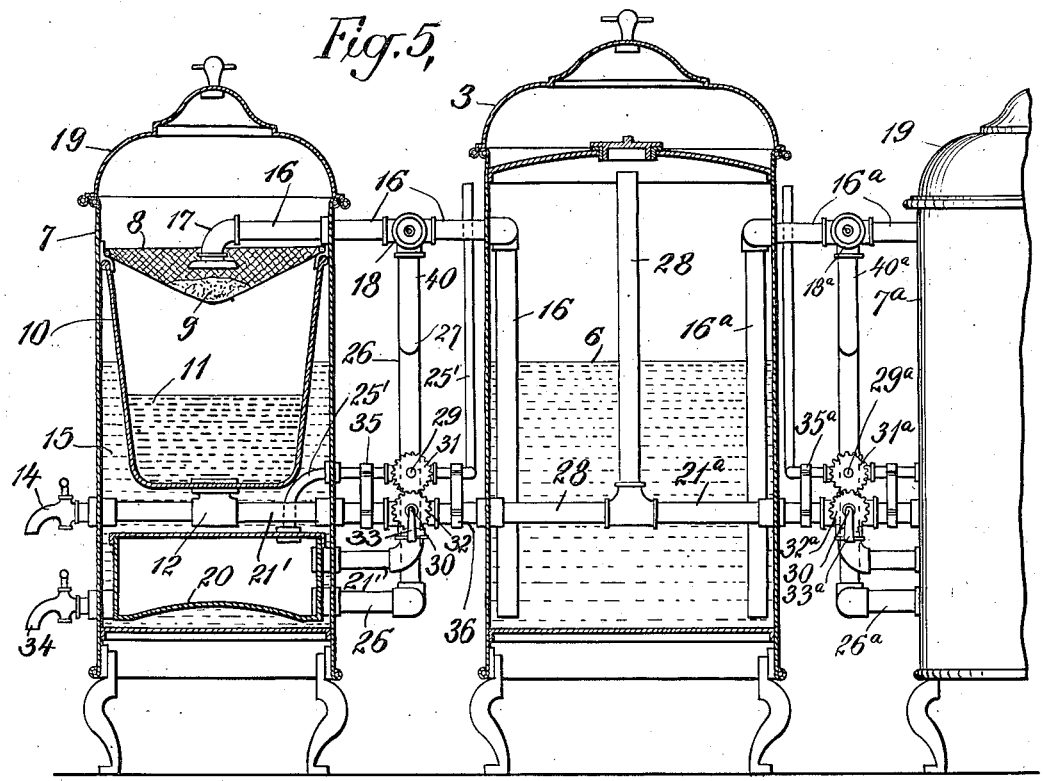
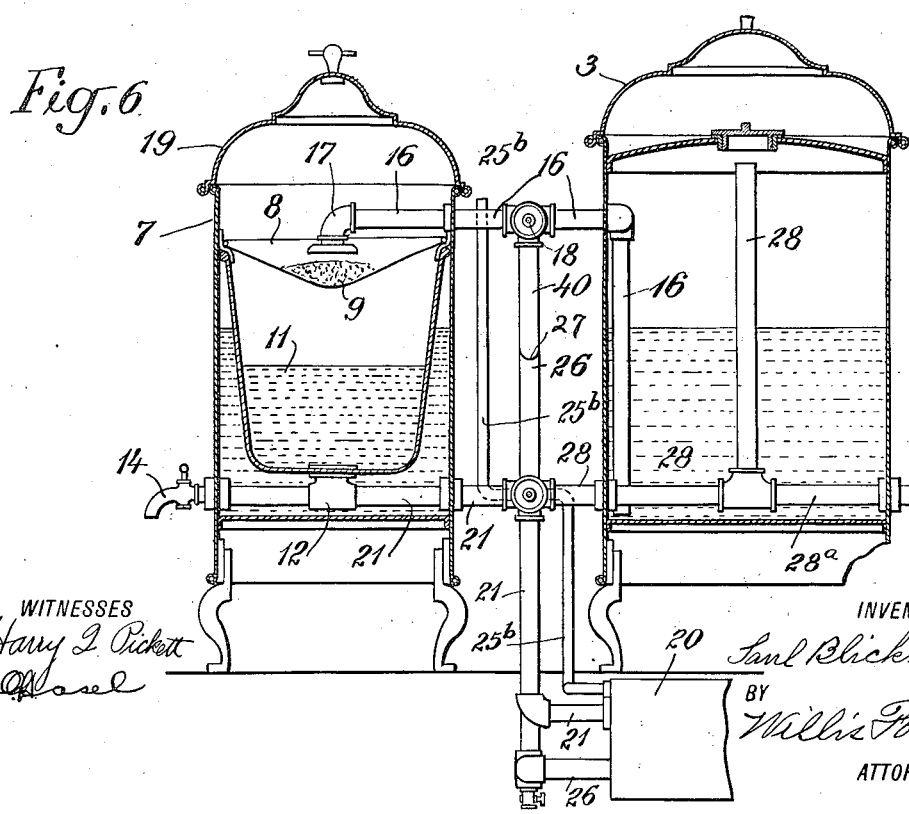

S. BLICKMAN.
APPARATUS FOR MAKING AND DISPENSING COFFEE.
APPLICATION FILED DEC. 27, 1912.
1,174,660.
Patented Mar. 7, 1916.
3 SHEETS—SHEET 3.
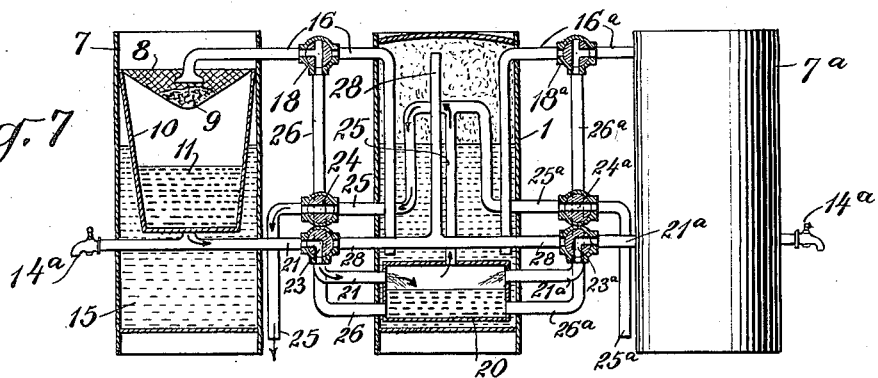
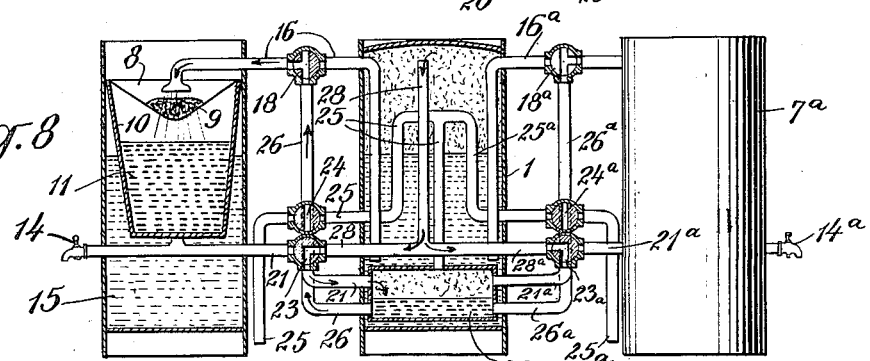
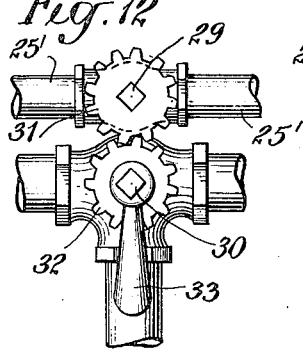
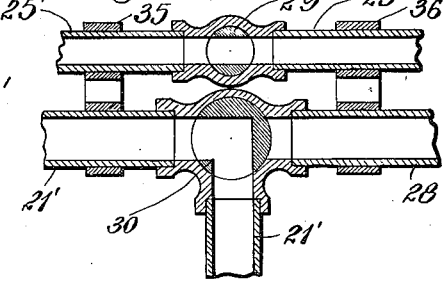
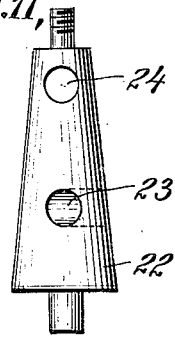
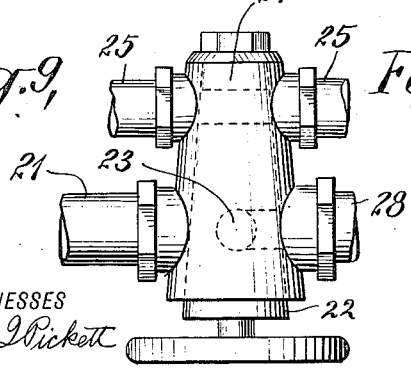
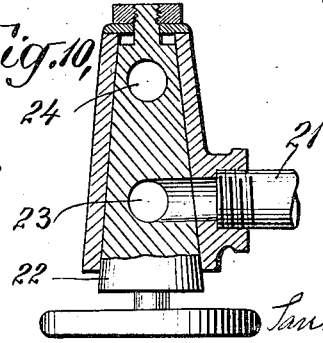
WITNESSES
Harry Pickett
H. O. Hasel
INVENTOR
Saul Blickman
BY
Willis Fowler.
ATTORNEY

UNITED STATES PATENT OFFICE.

SAUL BLICKMAN, OF NEW YORK, N. Y., ASSIGNOR TO SOPHIA BLICKMAN, OF NEW YORK, N. Y.

APPARATUS FOR MAKING AND DISPENSING COFFEE.

1,174,660.  Specification of Letters Patent.  Patented Mar. 7, 1916.

Application filed December 27, 1912. Serial No. 738,879.

*To all whom it may concern:*

Be it known that I, SAUL BLICKMAN, a citizen of the United States, residing in the borough of Manhattan, city of New York, county and State of New York, have invented certain new and useful Improvements in Apparatus for Making and Dispensing Coffee, of which the following is such a full, clear, and exact description as will enable any one skilled in the art to which it appertains to make and use the same, reference being had to the accompanying drawings, forming part of this specification.

My invention relates to apparatus in which coffee is made and from which it is served, and my improvements have reference more particularly to what are known as repouring urns in which the liquid coffee or extract after its original making may be transferred and poured through the ground coffee from which the original extract was made, and this repouring process may be repeated if desired.

By virtue of my invention I obtain certain important and novel advantages as hereinafter stated, and my invention consists in the certain novel and peculiar arrangements and combinations of the different parts of the apparatus, all as hereinafter fully set forth and then pointed out in the claims.

I have illustrated types of my invention in the accompanying drawings, wherein:

Figure 1 is a view of my improved apparatus with one of the urns, the boiler and the auxiliary tank shown in central vertical section. Fig. 2 is a top plan view of the apparatus shown in Fig. 1. Figs. 3 and 4 are enlarged detail views of certain of the valves, as hereinafter described. Fig. 5 is a similar view to that shown in Fig. 1, but with a different form of valve-gearing. In this view the auxiliary tank is shown as located within the hot-water jacket of one of the urns instead of being placed in the boiler. Fig. 6 is a central vertical sectional view of one of the urns and the boiler in a form of the apparatus in which the auxiliary tank is located to the outside of either the boiler or the urn. Fig. 7 is a diagrammatical view of the apparatus under the condition in which the valves are set so as to place the auxiliary tank in communication with the outer air and at the same time to pass the coffee extract from the holder to the tank for filling the latter. Fig. 8 is a similar diagrammatical view to that shown in Fig. 7 under the condition of operation in which the valves are set so as to cut off the auxiliary tank from the outer air and to subject the contents of the tank to the pressure of the boiler and at the same time connect said tank with the repouring pipe so as to pass its contents through the ground material. Figs. 9, 10 and 11 are enlarged detail views of the double or compound valve shown in Figs. 1, 2 and 6. Figs. 12 and 13 are enlarged detail views of the valve-gearing shown in Fig. 5.

Referring to the drawings, in which like numbers of reference designate like parts throughout, 1 is a boiler provided with an ordinary safety-valve 2, and having on its top a removable supplemental cover 3, for giving access to the hand-hole 4, in the top of the boiler and through which hole the interior of the boiler may be reached. Beneath the boiler is an ordinary Bunsen gas-burner 5, for heating the water 6, within the boiler. Upon two opposite sides of the boiler are arranged coffee urns 7 and 7ª, respectively. These two urns are constructed in the same way and are connected with the boiler and with the auxiliary tank in the same way, so that a description of one will serve for both, similar parts in one of the urns, and likewise its pipe connections, being marked with the same reference numeral with the addition of the index letter "*a.*"

In the upper part of the urn 7, is removably placed a receptacle 8, which is generally made of muslin or suitable fabric, and in it is placed the ground coffee 9. Beneath the receptacle 8, is a holder 10, for receiving and holding the liquid extract or coffee 11. In the bottom of the holder 10, is fixed a pipe-fitting or T 12, one branch of which is connected with a drawing-off pipe 13, which is provided with a faucet 14, upon the exterior of the urn for drawing off the coffee 11, in small quantities as desired. The holder 10, is provided with a hot water jacket 15.

A feed-pipe 16, extends from a point near the bottom of the boiler 1, to near the top of the same, and passes thence out of the boiler, across to the top of the urn 7, and enters the same. The end of the feed-pipe 16, terminates above the receptacle 8, and is provided with a shower 17, for showering the water on the ground coffee beneath it. The feed-pipe 16, is controlled by a hand-operated valve 18, which for the purpose of connecting the shower with the auxiliary tank hereinafter referred to, is a three-way valve. Boiling water is supplied to the shower by setting the valve 18, so as to permit the water 6, to pass from the boiler through the pipe 16, and under the boiler pressure. The top 19, of the urn is made removable in order to give free access to the receptacle and the shower as well as the holder within the urn.

An auxiliary tank 20, is arranged within the bottom of the boiler 1, as shown in Fig. 1, and it is a closed vessel or drum. A pipe 21, connected with a T 12, in the bottom of the holder 10, connects the latter with the auxiliary tank 20, and the passage-way of the pipe is controlled by a hand-valve 22, which is a compound valve of a rotary conical plug form, and in which are two separate ports 23 and 24, the former controlling the pipe 21, by means of which the coffee extract is transferred from the holder 10, to the tank 20. (See Figs. 9, 10 and 11 for details of this compound valve.)

A vent-pipe 25, leads from the top of the tank 20 and extends upwardly through the boiler to near the top, and then passes laterally toward the side of the boiler and down again to a point just above the tank, and passes again laterally out of the side of the boiler, and extends thence downwardly to a suitable point near the bottom of the boiler, where it is open to the outer air. This vent-pipe 25, is controlled by the valve-port 24, of the compound valve 22. (See Figs. 1, 2, 9, 10 and 11.) This valve 22, has its two ports so related that when the valve is turned so as to open the liquid transferring pipe 21, by means of the port 23, it simultaneously opens the air vent-pipe 25, by means of the port 24. Under this condition the liquid extract 11, may gravitate from the holder through the pipe 21 into the tank 20, and when the liquid has been thus transferred the compound-valve 22, is turned so as to close both the ports 23 and 24, thereby closing the tank against communication with the atmosphere.

The lower part of the tank 20, is connected by means of a pipe 26, with the valve-casing of the valve 18, located in the feed-pipe 16, as above referred to. This pipe 26, passes upwardly from the tank 20, and at the point 27, is bent forward to bring it in line with the valve 18, which when turned in one position opens the feed-pipe 16, from the boiler to the shower, as above described, and which, when turned into another position, shuts off the feed pipe 16, from the boiler and connects the pipe 26 of the tank with the shower 17, as will be more particularly understood from Fig. 4. See also the diagrammatic view in Fig. 7 for the condition under which the liquid coffee of the holder is transferred to the tank at a time when the latter is open to the outer air. In this diagram, the transfer process is shown as taking place from both of the urns to the tank, but it will be understood that this transfer is made only from one holder of an urn at a time, though, of course, it can be made from the two holders, if desired. When the liquid coffee has been thus transferred to the tank 20, and confined therein, and the valve 18, is set to place the tank in communication with the shower through means of the pipe 26, the pressure of the boiler is admitted to the tank 20 through means of the upright pipe 28, which extends from near the top of the boiler on its interior downwardly to a point just above the tank, and thence laterally out of the side of the tank to the valve 22, where it is controlled by the same port 23, as controls the liquid transfer-pipe 21. The valve 22, may be turned so as to connect the boiler pressure pipe 28, with the lower section of the pipe 21, which leads into the tank 20, and at the same time cutting off the other section of the pipe 21, which leads to the holder 10. Under this condition the steam pressure of the boiler has access to the tank 20, through means of the pipe 28, the valve-port 23, and the lower section of pipe 21, and this pressure will cause the contents of the tank to be forced through the pipe 26 upwardly past the valve 18, to the shower 17, where such contents are repoured on the ground coffee 9. The relation of the valves under this condition is shown in the diagrammatic view in Fig. 8, which, however, shows repouring from the holders of each of the two urns, but this is preferably not the operation of the apparatus as it is more desirable to repour from the holder of one urn at a time. However, by thus bringing together in the tank the liquid coffee from the different urns, a uniform mixture can thus be made, so that each urn may be made to deliver coffee of the same strength. When all of the liquid has been thus taken from the tank 20, and repoured upon the ground coffee, the valve 22, is turned so as to shut off communication between the boiler-pressure pipe 28, and the tank, and also to open communication with the air vent-pipe 25, and the tank 20, and at the same time close the transfer pipe 21. When it is desired to again repour the coffee extract 11, the valve 22, is again manipulated as described. As the valve 18 may be normally left so as to connect the tank pipe 26 with the branch of the pipe 16, leading to the shower, it requires only the manipulation of the valve 22, to effect the repouring, and this greatly simplifies the operation. The water-jacket 15 of the urn is kept at a suitable high temperature by means of an ordinary burner 5' placed beneath the urn.

In the construction shown in Fig. 5, the auxiliary tank 20, is placed in the water-jacket 15, of the urn 7, instead of being located in the boiler proper as shown in Fig. 1. This requires a slight rearrangement of some of the pipes namely, the air vent-pipe 25', which leads from the top of the tank out through the side of the urn where it is provided with a rotary valve 29, for controlling the passage-way of the pipe. (See more particularly Figs. 12 and 13.) The liquid transferring pipe 21' leads from the T-connection 12 out through the side of the urn where it is provided with a valve 30, and it extends thence downwardly and through the side of the urn into the tank 20, so that communication between the holder 10, and the tank 20, is by way of the pipe 21', and such communication is controlled by the valve 30. The boiler-pressure pipe 28, is substantially the same as in the construction shown in Fig. 1, and it is also controlled by the valve 30, so that it may be connected with the lower branch of the pipe 21', in order that the contents of the tank 20, may be subjected to boiler pressure.

In Fig. 13 the relation of the two valves 29 and 30, is shown. Under the condition indicated in this figure, the tank is opened to the outer air through the vent-pipe 25' by means of valve 29, and the transferring pipe 21', is in communication with the tank through the valve 30, which is opened for such communication by turning the valve 90° in the direction opposite to that in which the hands of a clock move, the boiler pressure pipe 28, is placed in communication with the lower branch of the pipe 21' so as to subject the contents of the tank to the boiler pressure and to close off connection between the tank and the holder. The two valves 29 and 30, are geared together by means of a pinion 31, secured to the stem of valve 29, and a similar pinion 32, secured to the stem of the valve 30, the two pinions meshing with each other. The stem of the valve 30, is also provided with a handle 33 for turning the valve. Accordingly the movement of the handle 33, sets both of the valves simultaneously so that the repouring may be effected in this construction by the operation of the single handle 33. The straps or brackets 35 and 36, are employed to hold the pipes 25', 21' and 28 in rigid relation to each other, as shown in Figs. 5 and 13. The tank 20, is provided with a faucet 34, and when the liquid coffee is transferred to the tank, the valves may be set so as to place the tank only in communication with the boiler-pressure-pipe 28, and this will place the contents of the tank under boiler pressure, so that liquid coffee may be drawn directly from the tank by the faucet 34, under steam pressure, which is an advantage in some cases. The tank in any of the arrangements shown may be provided with a similar faucet 34, but it is more convenient to have it in the arrangement shown in Fig. 5 as it brings it near the ordinary faucet 14, of the urn.

In Fig. 6 I show an arrangement of the apparatus in which the auxiliary tank 20, is located outside of both the boiler and the urn, as this arrangement may be preferred in some cases. When the tank is thus located, it may be made of glass, or may contain glass sections, so that the contents of the tank may be individually inspected whenever desired. By virtue of this arrangement the strength of the liquid coffee may also be determined when it is in the tank, so that the operator may make the extract stronger or weaker, as the case may be. In this arrangement shown in Fig. 6, the various pipes and valves are arranged and controlled substantially in the manner set forth in Fig. 1, with the exception, of the air vent-pipe 25$^b$, which extends from the auxiliary tank 20, passes upwardly through the casing of the valve 22, and passes thence upwardly to near the upper end of the urn 7, where it is open to the outer air. The auxiliary tank being located to the exterior of either the boiler or the urn, the vent-pipe 25$^b$, does not pass through either of these parts. A section 40, of the upper part of the pipe 26, is made of glass, and this enables the operator of the apparatus to inspect the liquid extract passing through the pipe 26, in the repouring operation, so that the strength of the beverage can be thus observed, and in this way it can also be noted when the auxiliary tank is emptied of its contents. The apparatus as here shown may at any time be flushed with boiling water by first removing both the ground and the liquid coffee and then admitting the water from the boiler through the pipe 16, to the shower 17, into the holder 10, and passing it thence through the pipe 21, by the valve 22, into the auxiliary tank 20, until the same is filled. Then by manipulating the valves the boiler pressure may be admitted to the auxiliary tank 20, and the hot water expelled therefrom through the tank-pipe 26, by way of valve 18, to the shower 17, and thence into the holder 10. From the holder 10, the hot water may be drawn off by the faucet 14. This arrangement provides a very sanitary apparatus, and one that may be quickly flushed at any time.

From the foregoing description the operation of my improved apparatus will be readily understood. The ground coffee 9, being placed in the receptacle 8, the valve 18, is turned so as to open the feed-pipe 16, and place the boiler in communication with the shower 17 and the boiling water is thus introduced to the ground coffee and allowed to pass through the same until a sufficient quantity has been supplied, whereupon the valve 18, is turned so as to close communication between the pipe 16, and the boiler. The liquid coffee 11, now stands in the holder 10, and it may be drawn off in small quantities by the faucet 14, as desired. In order, however, to pass the liquid extract 11, through the ground coffee 9, which still remains in the receptacle, the valve 22, is turned into position to place the transferring pipe 21, in communication with the auxiliary tank 20, and at the same time open the vent-pipe 25, leading from the tank. This permits the liquid extract 11, to gravitate into the tank 20, which is below the level of the holder 10, and when this has been accomplished, the air vent-pipe 25 is closed at the same time that the transfer-pipe 21, is cut off by adjusting the valve 22. Communication being open between the tank-pipe 26, and the shower 17, by way of valve 18, steam pressure from the boiler is introduced to the tank by turning the valve 22, so that its port 23, connects the pipe 28, with the lower part of the pipe 21, whereupon the liquid extract is forced from the tank 20 through the pipe 26, and the shower 17, which sprays it over the ground coffee 9. When all of the liquid has been expelled from the tank 20, the valve 22, is again adjusted so as to cut off the steam pressure from the boiler and at the same time close the transfer pipe 21, and open the air-vent 25.

In the use of this apparatus all of the dangers incident to the process of repouring by hand are eliminated, and the entire operation is performed by operating a single device within convenient reach. Furthermore, the apparatus does not need watching during the repouring operation, as there is no danger of overflowing. At no time is the liquid coffee subject to exposure to the atmosphere, and thus the cooling and deleterious action of the air are both avoided, the heat being retained at uniform temperature, which is necessary in making good coffee. At the same time the liquid coffee is not boiled so that none of the injurious or bitter elements of the ground coffee are permitted to get into the solution by over-heating. By repouring the coffee under boiler pressure a uniform extract is obtained, and the contents of the holder are prevented from settling into strata due to the difference in specific gravity of the different parts of the liquid.

In use, this apparatus proves more economical than the ordinary hand repouring apparatus, for the reason that the repouring operation may be so easily and quickly done, that the operator will invariably make all the repourings that are necessary with a given quantity of ground coffee. I find that by using say two pounds of ground coffee, and giving it the necessary repourings to completely extract all the essence therefrom, that I get a better quality or strength of beverage than can be obtained from two and one-half pounds of the same kind of coffee used in a non-pouring urn and with no repouring. This is a saving of about twenty per cent.

As the repouring operation is extremely simple and requires practically no skill, the ordinary operator is encouraged to make the repouring, and thus the use of the apparatus proves economical in that it obtains from the coffee all of the desirable elements so that there is practically no waste. Where several urns are used with one boiler, the repouring operation may be effected with one urn at a time, thus leaving the other urn or urns in use for ordinary service. It will also be noted that in my apparatus in which a plurality of urns are used, that the liquid extract contained in the holder of any one urn may be transferred to the auxiliary tank, and thence transferred under pressure of the boiler to the holder in one of the other urns, without in any way exposing the liquid beverage to the atmosphere and practically without reducing its temperature. This is an important advantage for the reason that in the use of a battery of urns of this kind, it is desirable not to use the last gallon or so of the liquid coffee as a beverage, but to mix the same with a fresh make of coffee, and this can be quickly done with this apparatus as just described. It will also be noted that by virtue of the arrangement of the valve-connections, that the pressure in the tank 20 cannot be greater than that in the boiler, for the reason that when the tank is in communication with the boiler it is at the same time under the control of the safety valve of the boiler. On the other hand when the tank is not in communication with the boiler, the tank is open to atmospheric pressure, so that in either case the apparatus is under safe conditions.

Having thus described my invention, what I claim and desire to secure by Letters Patent is:

1. In apparatus of the class described, the combination of a boiler, a receptacle for the solid material from which the extract is made and a holder for receiving the liquid extract from said solid material, a drawing-off faucet connected with said holder, an auxiliary-tank provided with a valve controlled air-vent, means for connecting at will the said tank with the interior of the boiler to subject the contents of the tank to the pressure in the boiler, means for connecting at will the said tank with the extract-holder, and pipe connections for passing the liquid extract from the tank under steam pressure to the solid material in said receptacle.

2. In apparatus of the class described, the combination of a boiler, a receptacle for the solid material from which the extract is made and a holder for receiving the liquid extract from said solid material, means for introducing water from the boiler at will to the solid material, a drawing-off faucet connected with said holder, an auxiliary-tank provided with a valve controlled air-vent, means for connecting at will the said tank with the interior of the boiler to subject the contents of the tank to the pressure in the boiler, means for connecting at will the said tank with the extract-holder, and pipe connections for passing the liquid extract from the tank under steam pressure to the solid material in said receptacle.

3. In apparatus of the class described, the combination of a boiler, a receptacle for the solid material from which the extract is made and a holder for receiving the liquid extract from said solid material, a drawing-off faucet connected with said holder, an auxiliary tank provided with a valve-controlled air-vent, means for connecting at will the said tank with the interior of the boiler to subject the contents of the tank to the pressure in the boiler, means for connecting at will the said tank with the extract-holder, and pipe connections for passing the liquid extract from the tank under steam pressure to the solid material in said receptacle, the said auxiliary tank being subjected to the heated contents of the apparatus.

4. In apparatus of the class described, the combination of a boiler, an urn, a receptacle for the solid material from which the extract is made and located within said urn, a holder arranged in said urn for receiving the extract from said solid material, means for introducing water at will to the solid material, a drawing-off faucet connected with said holder, an auxiliary tank provided with a valve controlled air-vent, means for connecting at will the said tank with the interior of the boiler to subject the contents of the tank to the pressure in the boiler, means for connecting at will the said tank with the extract-holder, and pipe connections for passing the liquid extract from the tank under steam pressure to the solid material in said receptacle, the said extract-holder being provided with a hot water jacket, and the said auxiliary tank being located within said boiler and subjected to the heat of the contents thereof.

5. In apparatus of the class described, the combination of an infuser having a holder for receiving the liquid-extract, said holder being provided with a drawing-off faucet, an auxiliary tank and connections between said tank and holder and also between said tank and infuser for transferring the liquid-extract from said holder through said tank to the infuser, means for reducing at will the pressure in said tank to atmospheric pressure, and means for subjecting at will the contents of the tank to pressure greater than atmospheric to force said contents into said infuser.

6. In apparatus of the class described, the combination of a plurality of urns each provided with a receptacle for the solid material from which the liquid extract is made and a holder for receiving the liquid extract from said solid material and each holder being provided with a drawing-off faucet, a boiler and an auxiliary tank common to all of said urns, means for connecting at will the said tank with any one of said liquid extract holders and passing the liquid extract to said tank, means for subjecting the contents of said tank to the pressure of the boiler, and pipe connections for passing the liquid extract from said tank under steam pressure to the solid material in the receptacle of the urn from the holder of which the coffee extract has been transferred to the tank in the operation of repouring, whereby during such repouring operation the other urn or urns may be used in the regular service.

7. In apparatus of the class described, the combination of a boiler, a receptacle for the solid material from which the extract is made and a holder for receiving the liquid extract from said solid material, a drawing-off faucet connected with said holder, an auxiliary tank provided with a valve-controlled air-vent, a valve-controlled pipe leading from said holder to the tank, pipe connections leading from said tank to a point above said receptacle and provided with a valve, and a valve-controlled connection between said boiler and the tank for admitting the steam pressure of the boiler to the tank.

8. In apparatus of the class described, the combination of a boiler, a receptacle for the solid material from which the extract is made and a holder for receiving the liquid extract from said solid material, a drawing-off faucet connected with said holder, an auxiliary tank provided with an air-vent, a pipe connecting said holder with the tank and pipe connections leading from said tank to a point above said receptacle, a compound valve for simultaneously controlling said pipe leading from the holder to the tank and the said air-vent, and a valve-controlled connection between said boiler and tank to admit the pressure of the boiler to the tank.

9. In apparatus of the class described, the combination of a boiler, a receptacle for the solid material from which the extract is made and a holder for receiving the liquid extract from said solid material, a drawing-off faucet connected with said holder, an auxiliary tank provided with an air-vent, a pipe connecting said holder with the tank and pipe connections leading from said tank to a point above said receptacle, a connection between said boiler and tank, and a compound valve for controlling said pipe connecting the holder with the tank and the said pipe leading from the tank to a point above the receptacle and the said connection between the boiler and the tank.

10. In apparatus of the class described, the combination of a boiler, a receptacle for the solid material from which the extract is made and a holder for receiving the liquid extract from said solid material, a drawing-off faucet connected with said holder, an auxiliary tank provided with a valve-controlled air-vent, a valve-controlled pipe leading from said holder to the tank, pipe connections leading from said tank to a point above said receptacle and provided with a valve, and a valve-controlled connection between said boiler and the tank for admitting the steam pressure of the boiler to the tank, and a valve-controlled pipe leading from said boiler to a point above said receptacle.

11. In apparatus of the class described, the combination of a boiler, a receptacle for the solid material from which the extract is made and a holder for receiving the liquid extract from said solid material, a drawing-off faucet connected with said holder, an auxiliary tank provided with a valve-controlled air-vent, a valve-controlled pipe leading from said holder to the tank, pipe connections leading from said tank to a point above said receptacle and provided with a valve, and a valve-controlled connection between said boiler and the tank for admitting the steam pressure of the boiler to the tank, a pipe leading from said boiler and connected with the said pipe which leads from the tank to the point above said receptacle, and a valve for controlling both said boiler-pipe and tank-pipe.

12. In apparatus of the class described, the combination of a plurality of urns each provided with a holder for the liquid extract, a boiler and an auxiliary tank common to all of said urns, each of said holders being provided with a valve-controlled pipe connecting it with the tank and each urn being provided with a valve-controlled pipe leading from said tank to a point above the extract-holder, a valve-controlled connection between said boiler and tank for admitting at will the pressure of the boiler to the tank, and a valve-controlled air-vent for the tank, whereby the liquid extract contained in the holder of one urn may be transferred to said tank and thence under boiler pressure be transferred to the holder in one of the other urns.

13. In apparatus of the class described, the combination of a boiler, a receptacle for the solid material from which the extract is made and a holder for receiving the liquid extract from said solid material, a drawing-off faucet connected with said holder, an auxiliary tank provided with an air-vent, a pipe connecting said holder with the tank and pipe connections leading from said tank to a point above said receptacle, means for simultaneously controlling both the pipe leading from the boiler to the tank and the said air-vent of the tank, and a valve-controlled connection between said boiler and tank to admit the pressure of the boiler to the tank.

14. In apparatus of the class described, the combination of a boiler, a receptacle for the solid material from which the extract is made and a holder for receiving the liquid extract from said solid material, a drawing-off faucet connected with said holder, an auxiliary tank provided with an air-vent, a pipe connecting said holder with the tank and pipe connections leading from said tank to a point above said receptacle, a connection between said boiler and tank to admit the pressure of the boiler to the tank, and a single device for controlling both said pipe leading from the holder to the tank and the said air-vent of the tank and also the connection between said boiler and the tank.

15. In apparatus of the class described, the combination of a plurality of infusers each having a holder for the liquid-extract, a transfer tank and a valved connection between said tank and each of said holders and each of said infusers, means for reducing at will the pressure in said tank to atmospheric pressure, and means for subjecting at will the contents of said tank to pressure greater than atmospheric to expel the contents of said tank.

16. In apparatus of the class described, the combination of an infuser having a holder for receiving the liquid extract and provided with a drawing-off faucet, a tank and valved connections between said tank and holder, a boiler and a valved water-supply pipe leading therefrom to said infuser, a valved pipe connecting said tank with said water-supply pipe, means for reducing at will the pressure in said tank to atmospheric pressure, and means for subjecting at will the contents of said tank to pressure greater than atmospheric to expel the contents from said tank.

In witness whereof, I have hereunto set my hand in the presence of the two subscribing witnesses.

SAUL BLICKMAN.

Witnesses:
  WILLIS FOWLER,
  HARRY J. PICKETT.